United States Patent [19]

Krauss

[11] Patent Number: 4,932,815
[45] Date of Patent: Jun. 12, 1990

[54] BORING OR REAMING TOOL

[75] Inventor: Helmut Krauss, Berlin, Fed. Rep. of Germany

[73] Assignee: H. Willy Krauss GmbH & Co., Beilngries, Fed. Rep. of Germany

[21] Appl. No.: 312,677

[22] Filed: Feb. 17, 1989

[30] Foreign Application Priority Data

Feb. 24, 1988 [DE] Fed. Rep. of Germany ....... 3805727

[51] Int. Cl.$^5$ .............................................. B23B 51/00
[52] U.S. Cl. .................................. 408/224; 408/227; 408/230
[58] Field of Search ............... 408/223, 227, 229, 230, 408/224

[56] References Cited

U.S. PATENT DOCUMENTS

| 2,084,737 | 6/1937 | Magnus ............................... 408/230 |
| 4,116,580 | 9/1978 | Hall et al. ............................ 408/230 |

FOREIGN PATENT DOCUMENTS

| 127608 | 8/1982 | Japan .................................... 408/230 |
| 963740 | 2/1983 | U.S.S.R. ............................... 408/223 |

OTHER PUBLICATIONS

Tool and Manufacturing Engineers Handbook, vol. 1, Machining, Fourth Edition, Society of Manufacturing Engineers, 1983, pp. 9–42, 43, and 107–110.

Primary Examiner—Daniel Howell
Attorney, Agent, or Firm—Hoffmann & Baron

[57] ABSTRACT

A tool in the form of a tapering borer or reamer has cutting portions adjacent the body of the tool with chip-receiving grooves therebetween, arranged alternately around the periphery of the tool. The cutting portions and the grooves may be of a helical configuration or may extend in a straight configuration parallel to the longitudinal axis of the tool. Each cutting portion has a cutting face and a relief face which intersect at a cutting edge. The cutting face defines a rake angle with respect to a first reference plane while the relief face defines a relief angle with respect to a second reference plane which is normal to the first reference plane. In order to improve chip removal from a workpiece being machined and the flow of chip material away therefrom, the relief angle of each cutting portion is dependent on the diameter of the generated surface defined by the cutting edges of the tool upon rotation thereof about its longitudinal central axis, said diameter varying in the longitudinal direction of the tool.

3 Claims, 3 Drawing Sheets

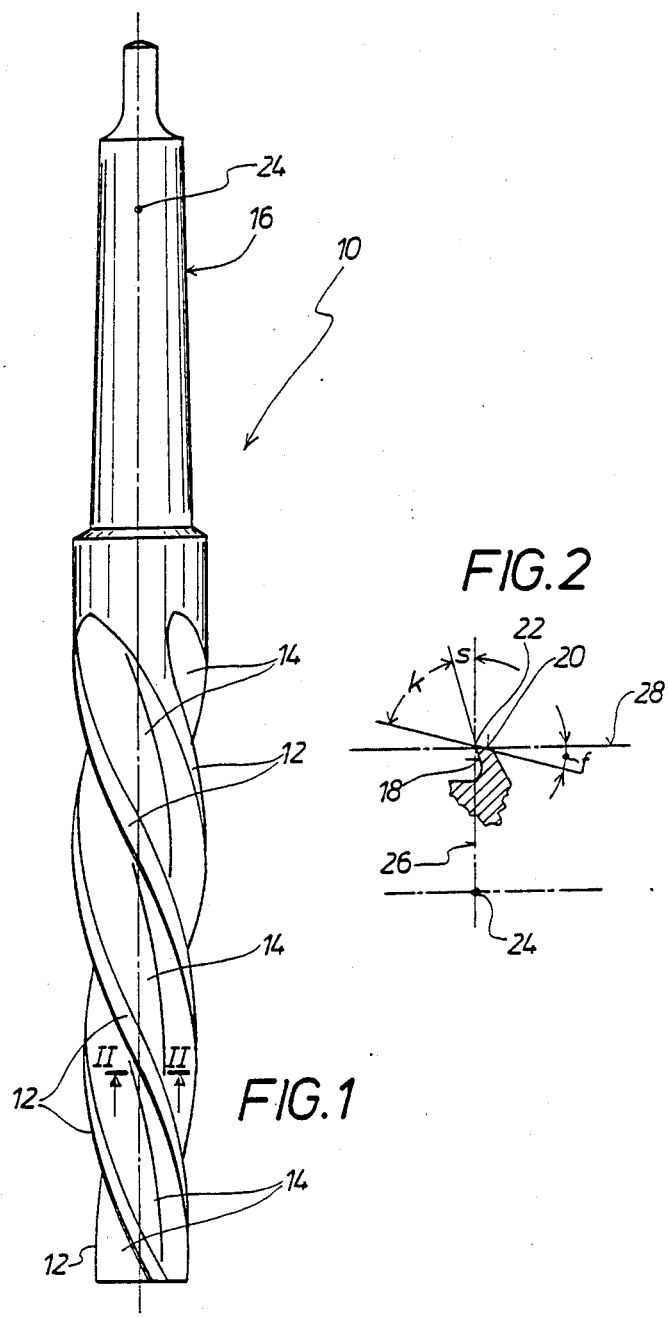

BORING OR REAMING TOOL

BACKGROUND OF THE INVENTION

Various forms of tapering borers or tapering reamers are known, a typical example of which comprises cutting portions which with their cutting edges define a tapering or conical generated surface when the tool is rotated about its longitudinal centre line. Between the cutting portions the tool has chip-receiving grooves, the cutting portions and the grooves extending in alternate relationship around the periphery of the tool. Each cutting portion comprises a cutting face and a relief face intersecting at the cutting edge. Each cutting portion may further include; a round grinding portion or "margin" adjoining the cutting edge. Together the cutting face and relief face define a wedge angle which is also known as the tool angle. The cutting face defines a rake angel, with respect to a first reference plane which extends through the longitudinal axis of the tool and the corresponding cutting edge, while the relief face defines a relief angle with respect to a second reference plane which is normal to the first reference plane and which extends through the respective cutting edge of the cutting portion.

In such tools the relief angle is constant along the longitudinal axis of the tool. In such a tool design the relief angle is fixed at the smallest diameter of the tool, that is to say the smallest diameter of the tapering generated surface formed by the rotational movement of the cutting edges of the cutting portions as the tool is rotated, for the reason that, as a result of the extent of the relief surface, the relief angle in that part of the tool cannot fall below a given value without adversely affecting the removal of chips from a workpiece to be machined. Then, as a result of the relief angle being constant over the entire length of the tool, at any diameter along the length of the tool which is larger than the above-mentioned minimum diameter, the tool has a relief face which is spaced from the generated surface referred to above. The distance between the generated surface and the relief face progressively increases, in proportion to the increase in the diameter of the generated surface in comparison with the above-mentioned minimum diameter thereof. Thus, as the diameter of the tapering generated surface increases, the space between that surface and the relief face of the tool becomes larger and larger in a completely unnecessary fashion. On the other hand, with a given wedge or tool angle in respect of the or each cutting portion, the rake angle of the or each cutting portion is fixed by virtue of the relief angle so that in the tapering tools of the above-discussed kind, with a constant relief angle, the rake angle also remains constant along each cutting portion if each cutting portion has a constant tool angle along its longitudinal extent. A constant tool angle for each cutting portion is generally desirable and is the conventional practice because it is only in that way that it is possible to provide for uniformity of wear of the cutting portions. Consequently, in the known tools in the form of tapering borers or tapering reamers, the rake angle is independent of the respective diameter of the tapering generated surface of the tool, and remains of the same magnitude. The result of that design configuration however is that the removal of chip material from the workpiece to be machined and the flow of chip material is the same over the entire length of the tapering tool.

SUMMARY OF THE INVENTION

An object of the present invention is to provide a tool which gives improved chip removal and chip flow away from the tool, over the length thereof.

Another object of the present invention is to provide a tapering tool which provides an enhanced level of cutting efficiency by appropriately guiding the flow of chip material away from the tool.

Yet another object of the present invention is to provide a tapering borer or reamer with a reduced tendency to clogging of the chip-removal grooves between the cutting portions thereof.

A still further object of the present invention is to provide a tapering tool which affords uniformity of wear of the cutting portions and cutting edges, thereby providing an enhanced service life.

In accordance with the present invention, these and other objects are achieved by a tool in the form of a tapering borer or tapering reamer, comprising cutting portions having cutting edges which define a tapering generated surface when the tool is rotated about its longitudinal centre line. The tool has chip-receiving grooves which are disposed alternately with the cutting portions around the periphery of the tool. Each cutting portion comprises a cutting tool face and a relief face, wherein the cutting face and the relief face intersect at the cutting edge of the corresponding flute, and together define a wedge or tool angle. The cutting face defines a rake angle with respect to a first reference plane extending through the longitudinal centre line of the tool and the corresponding cutting edge of the flute, while the relief face defines a relief angle with respect to a second reference plane which is normal to the first reference plane and which extends through said cutting edge. The relief angle of each cutting portion is dependent on the diameter of said generated surface, said diameter varying in the longitudinal direction of the tool.

It will be seen therefore that the relief angle of each cutting portion of the tool according to the invention is not constant over the entire length of the tool but varies with the diameter of the tool, that is to say the diameter of the generated surface which is defined by the cutting edges of the cutting portions when the tool is rotated about its longitudinal centre line.

In a preferred feature of the invention the relief angle of each cutting portion is inversely proportional to the respective diameter of the generated surface. In other words, at a position at which the diameter of the tapering generated surface or the diameter of the tapering tool is small, the relief angle is relatively large, while at a position at which the diameter of the generated surface or the tool is large, the relief angle is comparatively small in relation thereto. An important consideration in that respect is that the free space between the relief face of each cutting portion and the generated surface is at least approximately of the same magnitude, at the varying diameters of the tool.

In another preferred feature of the tool according to the invention the relief angle of each portion, within defined longitudinal portions of the tool, is dependent on the diameter of the generated surface in that longitudinal portion, and is constant. It will be seen therefore that, in such a tool, the relief angle does not vary in a linear fashion to correspond to the linear-tapering configuration of the tool, more specifically the generated surface of the tool, in the longitudinal direction thereof, but rather the relief angle varies over the length of the tool in a step-wise manner, in accordance with the above-mentioned specific longitudinal portions of the tool.

It has been found desirable for the tool angle of each cutting portion to be at least approximately constant so that the rake angle is proportionally dependent on the diameter of the generated surface, which diameter, as has been noted above, varies in the longitudinal direction of the tool. The taper angle being independent of the respective diameter of the tool over the entire length thereof means that the amount of wear over the entire length of the tapering tool is uniform, so that the tool enjoys a comparatively good service life. On the other hand, the design configuration of the tool according to the invention, with a relief angle for the individual cutting portions which is inversely proportional to the respective diameter of the tool or more specifically the tapering generated surface thereof means that the rake angle of the cutting face of the respective cutting portion can be comparatively large along longitudinal portions of the tool of relatively large diameter, in comparison with the rake angle of a longitudinal portion of the tool, which is of small diameter. Accordingly the rake angle increases from longitudinal portions of small diameter, to longitudinal portions of large diameter. With suitable dimensioning of the relief angle, the above-mentioned increase in the rake angle may occur continuously or stepwise. The fact that the rake angle of each cutting face varies along the length of the tool not only provides for an improvement in the removal of chip material from the workpiece to be machined, but at the same time also provides for the flow of chip material away from the tool being directed in the radial and in the longitudinal direction of the tool. That makes it possible better to resist clogging of the chip-receiving grooves, in comparison with previous tools.

Further objects, features and advantages of the present invention will be apparent from the following description of a preferred embodiment of the tool in the form of a tapering reamer.

BRIEF DESCRIPTION OF THE DRAWINGS

FIG. 1 is a side view of a reamer according to the invention in which the cutting portions and the grooves between same are of a helical configuration, FIG. 2 is a view in section taken along line II—II in FIG. 1.

DESCRIPTION OF THE PREFERRED EMBODIMENT

Figure 3:
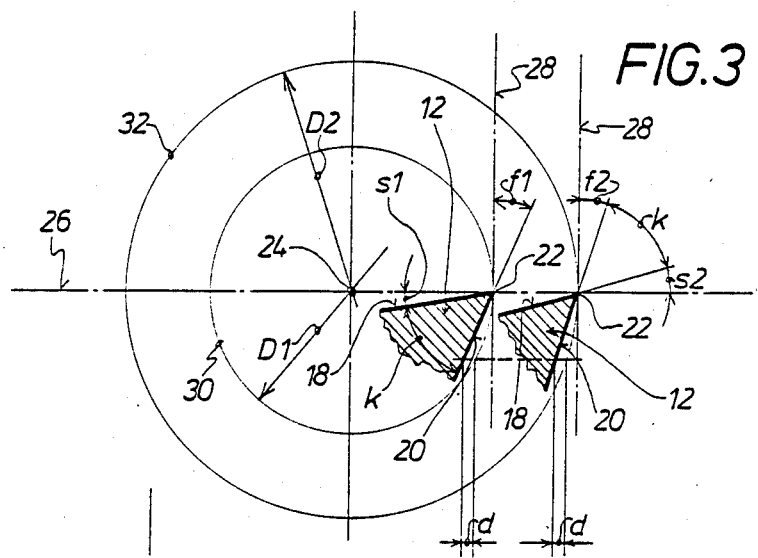
FIG. 3 is a view on a greatly enlarged scale of two portions of a cutting portion in which the cutting edges are of different diameters.

Referring firstly to FIG. 1, shown therein is a tool 10 in the form of a conical reamer having cutting portions 12 and chip-receiving grooves 14 which are disposed in alternate sequence around the periphery of the tapering tool 10. FIG. 1 shows a form of the tool 10 in which the cutting portions 12 and the grooves 14 are of a helical configuration but it will be appreciated that the tool 10 may also have cutting portions 12 and grooves 14 which extend in rectilinear and parallel relationship to each other and to the longitudinal direction of the tool 10, without therefore any helical twist therein.

Reference numeral 16 in FIG. 1 denotes a shank portion of the tool 10, for fixing the tool 10 in a tool holder.

Figure 6:
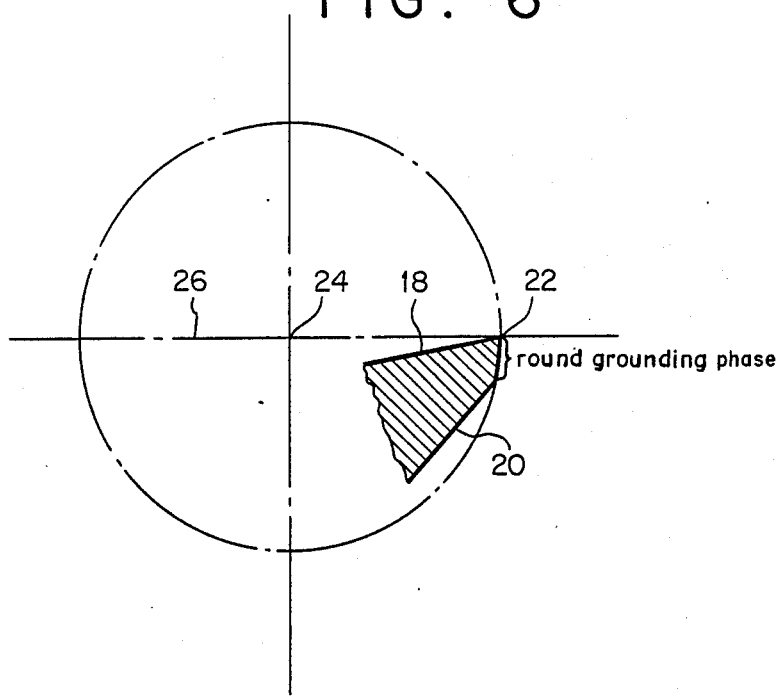
FIG. 6 is a view, on a greatly enlarged scale, of a cross section of a cutting portion of an alternative embodiment of the tool hereof, showing the round grinding phase of the cutting portion.

Reference will now also be made to FIG. 2 showing a portion of a cutting portion 12 comprising a cutting or tool face 18 and a relief face 20. The tool face 18 and the relief face 20 intersect at a cutting edge 22. As illustrated in FIG. 6, a round grinding phase may adjoin the cutting edge 22. Reference numeral 26 in FIG. 2 identifies a first reference plane which is normal to the plane of the drawing in FIG. 2 and which passes through the cutting edge 22 and through the longitudinal centre line 24 of the tool 10, which is also shown in FIG. 1. Reference numeral 28 in FIG. 2 identifies a second reference plane which passes through the cutting edge 22 and which is normal to the first reference plane 26. Like the first reference plane 26, the second reference plane 28 is also normal to the plane of the drawing in FIG. 2.

The relief face 20 forms a relief angle f with the second reference plane 28, the tool face 18 forms a rake angle s with the first reference plane 26, and the tool face 18 and the relief face 20 define a wedge or tool angle k between them.

Referring now to FIG. 3, shown therein is a first portion of a cutting portion 12 of small diameter and a second portion of a cutting portion 12 of larger diameter. The cutting portion 12 of small diameter, as indicated at D1, has a relief angle f1 which is defined by a spacing d between the relief face 20 and the circular line 30 which is defined by the cutting edge 22 of the cutting portion 12 of small diameter D1, upon rotational movement thereof. The relief angle f1 is defined between the relief face 20 and the second reference plane 28. Disposed normal to the second reference plane 28 is the first reference plane 26 which passes through the cutting edge 22 and the longitudinal centre line 24 of the tool. In FIG. 3 the longitudinal centre line 24 is normal to the plane of the drawing. The cutting portion 12 of small diameter D1 has a tool face 18 which forms a rake angle s1 with respect to the first reference plane 26. The face 18 and the face 20 together define the tool or wedge angle k.

During rotational movement of the tool 10 around the longitudinal centre line 24, the cutting portion 12 of large diameter D2, with its cutting edge 22, defines a circular path indicated in FIG. 3 by the circular line 32. That cutting portion 12 is of such a configuration that its relief face 20 is also at the spacing d from the circular line 32. It will be appreciated that the spacings d of the two cutting portions 12 of respectively different diameters D1 and D2 are defined at the same distance from the first reference plane 26. That means however that the relief angle f2 between the relief face 20 and the second reference plane 28 of the cutting portion 12 of large diameter D2 is smaller than the above-described relief angle f1. If the cutting portion 12 of large diameter D2 has the same tool angle k as the cutting portion 12 of small diameter D1, then the rake angle s2 between the tool face 18 and the first reference plane 26 at the portion of the cutting portion 12 of large diameter D2 may be larger than the rake angle s1 by the same amount as that by which the relief angle f2 is smaller than the relief angle f1. As a result of the tool angle k being constant, that configuration provides for a uniform amount of wear over the entire length of each cutting portion 12, thus giving the cutting tool 10 a long service life. On the other hand, the increase in the size of the rake angle s gives an improvement in the removal of chip material and also an improvement in the flow of chip material away from the workpiece over the tool face 18 of each cutting portion 12.

Figures 4, 5:
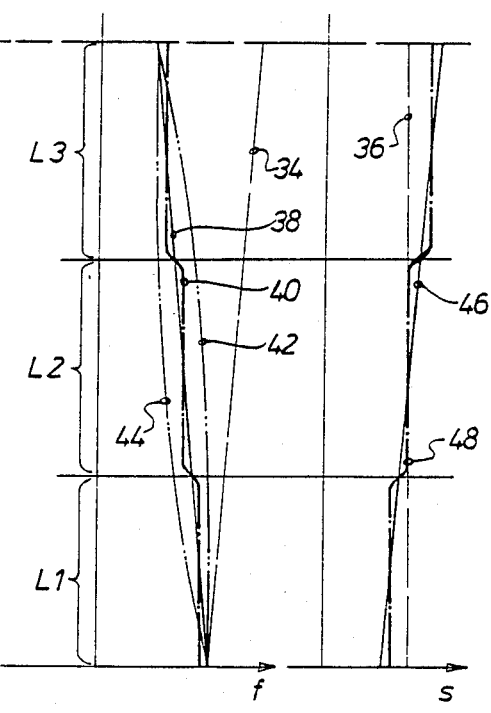
FIG. 4 is a diagrammatic representation of the tapering generated surface which is formed by the cutting edges of the cutting portions of the tool according to the invention when the tool is rotated about its longitudinal axis.
FIG. 5 is a graphic representation of the dependency of the relief angle f and the rake angle s in the axial direction of the tool.

FIG. 4 is a diagrammatic representation of the tapering generated surface 34 which is defined by the cutting edges 22 of the cutting portions 12 of the tapering tool 10 upon rotational movement of the tool 10 about its longitudinal centre line 24. In FIG. 4, reference character D1 denotes a relatively small diameter of the tapering tool 10 while reference character D2 identifies a diameter of the tool 10 which is comparatively large in relation to D1.

Turning now to FIG. 5, shown therein is a graphic representation of the relationship between the relief angle f and the respective diameter over the longitudinal extent of the tool, and the relationship between the rake angle s of each cutting portion 12 of the tool 10 in dependence on the diameter D or in dependence on a respective position over the longitudinal dimension of the tool 10. Broken lines 34 and 36 in FIG. 5 respectively indicate the relief angle f and the rake angle s of a known tool as described above in the opening part of this specification. It will be seen from the line 34 that in a known tool the relief angle increases as the diameter D increases. As shown by the line 36 on the other hand the rake angle s remains constant over the length of the tool 10. In comparison therewith, the relief angle f of the tool 10 in accordance with the principles of the present invention varies with the diameter D of the tool. That variation in the relief angle f may be of a linear nature, as indicated by the line 38, but it may also be of a stepwise configuration, as indicated by the broken line 40. It will be appreciated that the variation in the relief angle f with diameter D may also be of any other desired configuration, as indicated by the two broken lines 42 and 44. As indicated by the line 38, the relief angle f decreases in a linear relationship with increasing diameter D while the line 40 shows a reduction in the relief angle f in steps, in other words, the relief angle f is constant over the length of defined longitudinal portions L1, L2 and L3 of the tool, in which case the relief angle f in the portion L1 of small diameter D is larger than the relief angle f in the portions L2 and L3 of larger diameters. A linear reduction in the relief angle f as indicated by the line 38 involves a linear increase in the rake angle s from portions of the tool which are of small diameter, to portions of the tool which are of larger diameter. That linear increase in the rake angle s is indicated in FIG. 5 by the line 46. If, as indicated by the line 40, the relief angle f decreases in a stepwise manner from a portion of small diameter through portions of larger diameter, then the rake angle s increases in a stepwise manner, in a corresponding fashion. That stepwise increase in the rake angle s is indicated in FIG. 5 by the dash-dotted line 48 at the right-hand side of the Figure.

It will be appreciated that the above-described embodiment of the tool in accordance with the principles of the present invention has been described solely by way of example and illustration thereof and that various modifications and alterations may be made therein without thereby departing from the spirit and scope of the invention.

I claim:

1. A tool in the form of a tapering borer having a body, said tool comprising:

a plurality of cutting portions each having a cutting face and a relief face which mutually intersect to provide a cutting edge on the respective cutting portion, said cutting edges defining a tapering generated surface when the tool is rotated about its longitudinal axis, the cutting face and the relief face of each cutting portion together defining a tool angle therebetween, with the cutting face being disposed at a rake angle with respect to a first reference plane which extends through the longitudinal axis of the tool and the cutting edge of the respective cutting portion, and the relief face being disposed at a relief angle with respect to a second reference plane which is normal to the first reference plane and which extends through the cutting edge of the respective cutting portion, said relief angle of each said cutting portion being constant over the length of defined longitudinal portions of the tool, the relief angle of any one of the defined portions of the tool being different from the relief angle of any other of the defined portions of the tool such that the relief angles of the cutting portions vary in a stepwise manner longitudinally over the tool; and chip grooves between respective cutting portions whereby the cutting portions and the grooves alternate around the periphery of the tool.

2. A tool as set forth in claim 1 wherein said tool angle of each said cutting portion is at least substantially constant whereby said rake angle of each said cutting portion is inversely proportional to the relief angle and varies in a stepwise manner longitudinally over the tool.

3. A tool as set forth in claim 1 which is in the form of a reamer.

* * * * *